US012706089B2

(12) United States Patent
Sivaraman et al.

(10) Patent No.: US 12,706,089 B2
(45) Date of Patent: Aug. 11, 2026

(54) SPEAKER SPECIFIC SPEECH ENHANCEMENT

(71) Applicant: PINDROP SECURITY, INC., Atlanta, GA (US)

(72) Inventors: Ganesh Sivaraman, Atlanta, GA (US); Avrosh Kumar, Atlanta, GA (US); Elie Khoury, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 371 days.

(21) Appl. No.: 17/475,226

(22) Filed: Sep. 14, 2021

(65) Prior Publication Data

US 2022/0084509 A1 Mar. 17, 2022

Related U.S. Application Data

(60) Provisional application No. 63/077,928, filed on Sep. 14, 2020.

(51) Int. Cl.
*G10L 15/16* (2006.01)
*G06N 3/04* (2023.01)
(Continued)

(52) U.S. Cl.
CPC .............. *G10L 15/16* (2013.01); *G10L 17/22* (2013.01); *G06N 3/04* (2013.01); *G06N 20/00* (2019.01)

(58) Field of Classification Search
CPC ......... G10L 25/78; G10L 15/02; G10L 15/16; G10L 17/22; G10L 21/02; G06N 20/00; G06N 3/04
(Continued)

(56) References Cited

U.S. PATENT DOCUMENTS

| | | | |
|---|---|---|---|
| 9,824,692 | B1 | 11/2017 | Khoury et al. |
| 10,141,009 | B2 | 11/2018 | Khoury et al. |

(Continued)

OTHER PUBLICATIONS

S. A. Nossier et al. "Two-Stage Deep Learning Approach for Speech Enhancement and Reconstruction in The Frequency and Time Domains," 2022 International Joint Conference on Neural Networks (IJCNN), Padua, Italy, 2022, pp. 1-10. doi: 10.1109/IJCNN55064.2022.9892355. (Year: 2022).*

(Continued)

*Primary Examiner* — Richemond Dorvil
*Assistant Examiner* — Rodrigo A Chavez
(74) *Attorney, Agent, or Firm* — Foley & Lardner LLP

(57) ABSTRACT

Embodiments described herein provide for a machine-learning architecture system that enhances the speech audio of a user-defined target speaker by suppressing interfering speakers, as well as background noise and reverberations. The machine-learning architecture includes a speech separation engine for separating the speech signal of a target speaker from a mixture of multiple speakers' speech, and a noise suppression engine for suppressing various types of noise in the input audio signal. The speaker-specific speech enhancement architecture performs speaker mixture separation and background noise suppression to enhance the perceptual quality of the speech audio. The output of the machine-learning architecture is an enhanced audio signal improving the voice quality of a target speaker on a single-channel audio input containing a mixture of speaker speech signals and various types of noise.

21 Claims, 6 Drawing Sheets

(51) Int. Cl.
*G06N 20/00* (2019.01)
*G10L 17/22* (2013.01)

(58) Field of Classification Search
USPC .................................. 704/226, 233, 232, 202
See application file for complete search history.

(56) References Cited

U.S. PATENT DOCUMENTS

| | | | | |
|---|---|---|---|---|
| 10,692,502 | B2 | 6/2020 | Khoury et al. | |
| 11,095,572 | B1 | 8/2021 | Stafford et al. | |
| 2013/0030800 | A1* | 1/2013 | Tracey | G10L 21/003 704/219 |
| 2016/0293167 | A1* | 10/2016 | Chen | H04N 21/23406 |
| 2017/0178666 | A1* | 6/2017 | Yu | G10L 25/30 |
| 2018/0254046 | A1 | 9/2018 | Khoury et al. | |
| 2019/0066713 | A1* | 2/2019 | Mesgarani | G10L 25/30 |
| 2019/0172476 | A1* | 6/2019 | Wung | G10L 21/0232 |
| 2019/0378529 | A1* | 12/2019 | Li | G10L 25/30 |
| 2020/0143819 | A1* | 5/2020 | Delcroix | G10L 21/0272 |
| 2020/0202869 | A1* | 6/2020 | Wang | G10L 17/00 |
| 2020/0219530 | A1* | 7/2020 | Nesta | G06N 3/08 |
| 2020/0335121 | A1* | 10/2020 | Mosseri | G10L 15/25 |
| 2021/0151344 | A1 | 5/2021 | Hosek | |
| 2021/0233541 | A1 | 7/2021 | Chen et al. | |
| 2021/0241776 | A1 | 8/2021 | Sivaraman et al. | |
| 2021/0280171 | A1 | 9/2021 | Phatak et al. | |
| 2021/0390959 | A1* | 12/2021 | Jain | A61B 5/7267 |
| 2022/0165288 | A1* | 5/2022 | Wang | G10L 13/02 |
| 2022/0199095 | A1* | 6/2022 | Chang | G10L 17/06 |
| 2022/0301575 | A1* | 9/2022 | Yasuda | G10L 25/18 |
| 2023/0290357 | A1* | 9/2023 | Khoury | G10L 17/04 |

OTHER PUBLICATIONS

Y. Zhao, Z.-Q. Wang and D. Wang, "A two-stage algorithm for noisy and reverberant speech enhancement," 2017 IEEE International Conference on Acoustics, Speech and Signal Processing (ICASSP), New Orleans, LA, USA, 2017, pp. 5580-5584, doi: 10.1109/ICASSP.2017.7953224. (Year: 2017).*

D. S. Williamson and D. Wang, "Time-Frequency Masking in the Complex Domain for Speech Dereverberation and Denoising," in IEEE/ACM Transactions on Audio, Speech, and Language Processing, vol. 25, No. 7, pp. 1492-1501, Jul. 2017, doi: 10.1109/TASLP.2017.2696307. (Year: 2017).*

X. Hao et al., "Masking and Inpainting: A Two-Stage Speech Enhancement Approach for Low SNR and Non-Stationary Noise," ICASSP 2020—2020 IEEE International Conference on Acoustics, Speech and Signal Processing (ICASSP), Barcelona, Spain, 2020, pp. 6959-6963, doi: 10.1109/ICASSP40776.2020.9053188. (Year: 2020).*

International Search Report and Written Opinion for PCT/US2021/049809 dated Dec. 13, 2021 (7 pages).

International Preliminary Report on Patentability for PCT App.PCT/US2021/049809 dated Mar. 7, 2023 (6 pages).

* cited by examiner

SPEAKER SPECIFIC SPEECH ENHANCEMENT

CROSS-REFERENCE TO RELATED APPLICATIONS

This application claims priority to U.S. Provisional Application No. 63/077,928, filed Sep. 14, 2020, which is incorporated by reference in its entirety.

This application generally relates to U.S. Pat. No. 9,824,692, entitled "End-To-End Speaker Recognition Using Deep Neural Network," filed Sep. 12, 2016, which is incorporated by reference herein in its entirety.

This application generally relates to U.S. Pat. No. 10,692,502, entitled "Method and Apparatus for Detecting Spoofing Conditions," filed Mar. 2, 2018, which is incorporated by reference herein in its entirety.

This application generally relates to U.S. application Ser. No. 17/155,851, entitled "Robust Spoofing Detection System Using Deep Residual Neural Networks," filed Jan. 22, 2021, which is incorporated by reference herein in its entirety.

This application generally relates to U.S. application Ser. No. 17/192,464, entitled "Systems and Methods of Speaker-Independent Embedding for Identification and Verification from Audio," filed Mar. 4, 2021, which is incorporated by reference herein in its entirety.

This application generally relates to U.S. application Ser. No. 17/165,180, entitled "Cross-Channel Enrollment and Authentication of Voice Biometrics," filed Feb. 2, 2021, which is incorporated by reference herein in its entirety.

This application generally relates to U.S. Pat. No. 10,141,009, entitled "System and Method for Cluster-Based Audio Event Detection," filed May 31, 2017, which is incorporated by reference herein in its entirety.

This application generally relates to U.S. application Ser. No. 16/775,146, entitled "Unsupervised Keyword Spotting and Word Discovery for Fraud Analytics," filed Jan. 28, 2020, which is incorporated by reference herein in its entirety.

TECHNICAL FIELD

This application generally relates to systems and methods for managing, training, and deploying a machine learning architecture for audio processing and improving the quality of audio signals containing various speakers' speech and noise degradation.

BACKGROUND

Speech enhancement technology has typically been used for removal of background noise from audio. The background noise is usually assumed to not contain any intelligible speech. The problem of separating speech of multiple simultaneous speakers is more challenging.

Speaker mixture separation has been a problem of interest and active work for several decades. Voice-processing systems would benefit from improved ways for separating the mixture of multiple speakers' speech signals embodied in a single audio signal. Traditional signal processing based approaches used multi-pitch tracking, independent component analysis, and non-negative matrix factorization, among others. These approaches are cumbersome and obsolete in view of modern computing speeds. More recent approaches are based on deep neural networks to model the feature extraction, speaker separation, and target speech reconstruction. Examples of the recently developed techniques for speaker separation include: deep clustering, deep attractor network, time domain audio separation network (TASNet) and the Conv-TASNet, and voice filtering. Most of the existing approaches focus only on the problem of speech separation. The training and evaluations of the existing approaches are focused on clean speech mixtures. Approaches, such as deep clustering, deep attractor networks, and TASNets, perform separation of all the individual speech streams in the mixture in an unnecessarily complex operation. These approaches cannot select just one speech stream for separation.

Voice filtering uses a neural network architecture based on speaker voiceprint to select a target speaker from the speech mixture. However, voice filtering requires pre-stored enrollment voiceprints to function and cannot generate voiceprints in real-time. Nor can voice filtering reduce background noise in the mixture audio signal.

SUMMARY

Disclosed herein are systems and methods capable of addressing the above-described shortcomings and may also provide any number of additional or alternative benefits and advantages. While prior approaches viewed speech separation and noise reduction as distinct operations that required distinct programmed solutions, the embodiments described herein provide for a real-time machine-learning architecture (e.g., neural network architecture) system that enhances the speech audio of a user-defined target speaker by suppressing interfering speakers, as well as background noise and reverberations, all within a related cascade of machine-learning architectures. The machine-learning architecture for speaker-specific speech enhancement performs the dual tasks of speaker mixture separation and background noise suppression to enhance the perceptual quality of the speech audio. The target speaker for the speaker-dependent enhancement system is specified and indicated using the speaker's voiceprint. The target speaker for enhancement is uniquely determined using a voiceprint vector extracted by a speaker embedding system. In some cases, the target speaker's voiceprint may be extracted in real-time while the software programming is being used, though some embodiments offer an option for prior enrollment using an enrollment utterance. The output of the machine-learning architecture is an enhanced audio signal improving the voice quality of a target speaker on a single-channel audio input containing a mixture of speaker speech signals and various types of noise.

In an embodiment, a computer-implemented method comprises receiving, by a computer, an inbound audio signal including a signal mixture of a plurality of inbound speakers; extracting, by the computer, a first set of one or more features from the inbound audio signal; extracting, by the computer, a speaker mask for the inbound audio signal by applying a first machine-learning architecture on a target voiceprint and the first set of one or more features; generating, by the computer, a second set of one or more features of a target audio signal by applying the speaker mask on the first set of one or more features; extracting, by the computer, a noise mask for the target audio signal by applying a second machine-learning architecture on the second set of one or more features; and generating, by the computer, an enhanced audio signal by applying the noise mask on the second set of one or more features.

In another embodiment, a computer-implemented method comprises a non-transitory machine readable storage configured to store machine-executable instructions for one or more machine-learning architectures; and a computer comprising a processor and configured to receive an inbound audio signal including a signal mixture of a plurality of inbound speakers; extract a first set of one or more features from the inbound audio signal; extract a speaker mask for the inbound audio signal by applying a first machine-learning architecture on a target voiceprint and the first set of one or more features; generate a second set of one or more features of a target audio signal by applying the speaker mask on the first set of one or more features; extract a noise mask for the target audio signal by applying a second machine-learning architecture on the second set of one or more features; and generate an enhanced audio signal by applying the noise mask on the second set of one or more features.

In yet another embodiment, a computer-implemented method comprises receiving, by a computer, an inbound audio signal including a signal mixture of a plurality of inbound speakers; applying, by the computer, a speaker suppression machine-learning architecture to the inbound audio signal; applying, by the computer, a noise suppression machine-learning architecture to an output of the speaker suppression machine-learning architecture; and generating, by the computer, an enhanced audio signal based on an output of the noise suppression machine-learning architecture.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
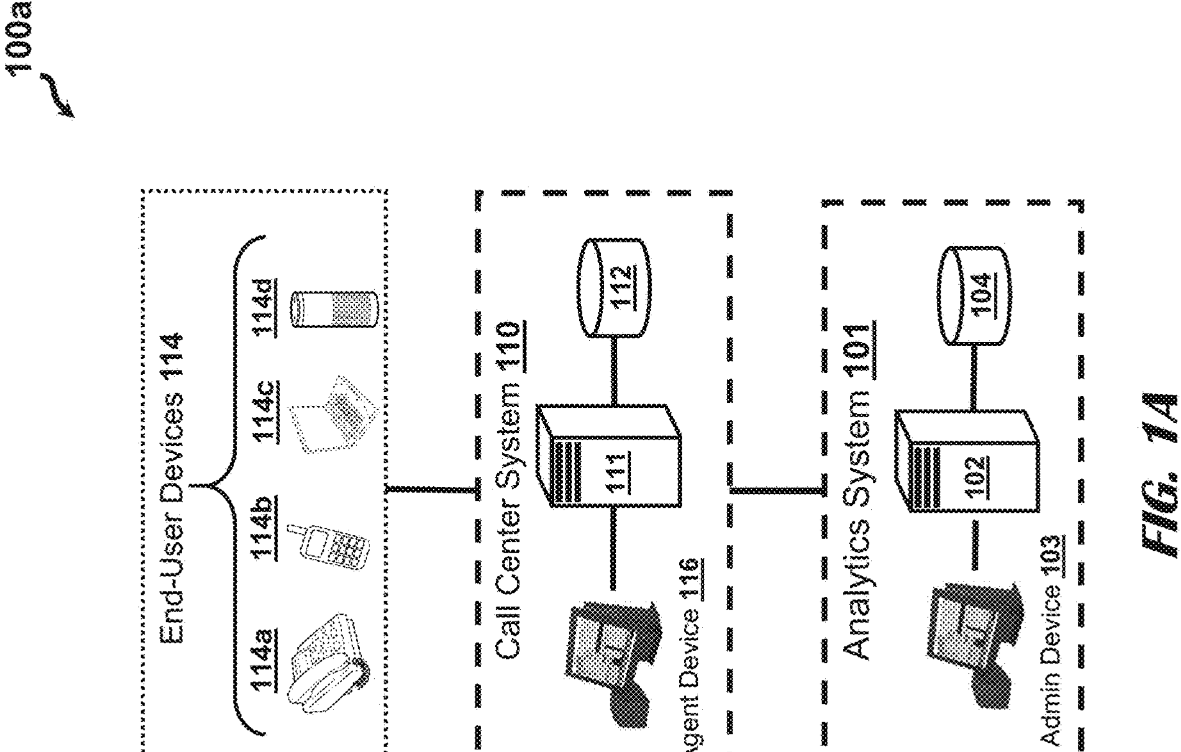
FIG. 1A shows components of a system for receiving and analyzing telephone calls, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for processing various types of data associated with inbound calls, including audio signals containing a mixture of one or more speaker signals or utterances, protocol metadata, and caller inputs, to generate an enhanced audio signal in which utterances of interfering speakers and noise are suppressed compared to the input audio signal received by the system. The system may perform various operations using the enhanced audio signal, such as speaker recognition operations or determining a risk of fraud associated with calls or data traffic directed to an enterprise's customer contact channel (e.g., call center, service provider's website). In some embodiments, the system receives calls or data traffic through any number of channels, such as typical telephony networks or data communications networks (e.g., Internet, private intranet). Computing devices of the enterprise's call center capture, store, and forward the call data (e.g., audio data, metadata) to a server that performs various analytics operations on the call data or other form of contact data.

Some embodiments relate to call centers implementing a speaker-specific speech enhancement machine-learning architecture discussed herein, but embodiments are not limited to such call center implementations or telephony-based calls. Embodiments may include, for example, a software application or programming executed locally at an end-user device that processes an audio signal prior to transmitting an enhanced version of the audio signal for the particular software application's operations (e.g., phone call, video conferencing call). Embodiments may include any system in which a computing device may receive an input audio signal containing a mixture of speaker speech and background noise and execute the various layers of the machine-learning architecture for a speaker-specific enhancement system described herein. Non-limiting examples may include servers hosting an voice or teleconference software service (e.g., Skype®, BlueJeans®) and computing devices, smartphones, or Internet of Things (IoT) devices that capture voice signals, such as personal assistance (e.g., Amazon Alexa®), among others.

Embodiments described herein include one or more computing devices that execute a machine-learning architecture for performing certain analytics operations. The machine-learning architecture includes, for example, a first machine-learning architecture for separating a target speaker's utterances from a mixture of speakers' utterances in an audio signal, a second machine-learning architecture for suppressing or mitigating noise in the audio signal, and a third machine-learning architecture for speaker recognition or extracting an embedding feature vector representing features of the target speaker's utterances in the audio signal. For ease of description, embodiments described herein implement a single machine-learning architecture comprising the three constituent sub-architectures mentioned above, though embodiments may include any number of distinct machine-learning architectures configured to function as discussed herein and executed by any number of computing devices. The machine-learning architectures may include any number and combination of machine-learning techniques or types of machine-learning structures, such as neural network architectures (e.g., convolution neural networks, deep neural networks), and Gaussian Mixture Models (GMMs), among others. For ease of description, the operations or components the machine-learning architecture or sub-architectures are described as "layers," though the machine-learning architecture need not include a neural network architecture and thus the term "layers" may refer to any machine-executable operations of the machine-learning architecture. The machine-learning architecture generally includes layers defining three sub-architectures, including the speech separation engine, the noise suppression engine, and the speaker-embedding engine.

The speech separation engine receives an input audio signal containing a mixture of speaker signals and one or more types of noise (e.g., additive noise, reverberation). The speech separation engine extracts low-level spectral features, such as such as mel-frequency cepstrum coefficients (MFCCs), and receives a voiceprint for a target speaker (sometimes called an "inbound voiceprint" or "target voiceprint") generated by the speaker-embedding engine. Using these two inputs, the speech separation engine generates a speaker mask for suppressing speech signals of interfering speakers. The speech separation engine applies the speaker mask on the features extracted from the input audio signal containing the mixture of speech signals, thereby suppressing the interfering speech signals and generating a target speaker signal or a set of one or more features for the target speaker signal. The machine-learning architecture then feeds the features of the target speaker signal into the noise suppression engine.

For training, the speech separation engine receives a training dataset including training audio signals for hundreds, thousands, or more speaker signals. For a particular training signal, a user or the host device selects a target speaker and randomly selects one or more utterances from that target speaker. The host device stores one of the target audio signals as a "clean" reference utterance for extracting a target voiceprint. The host device mixes the other target utterances with one or more randomly selected utterances from another speaker (sometimes called an "interfering speaker") in the dataset. The host device mixes the target speaker's clean utterance with the interfering speaker's utterance, thereby generating a simulated training audio signal containing a mixture of speakers' speech signals. The host device may trim the simulated audio signal containing the mixture down to a time length of the target's clean utterance. During the mixing operation for producing the simulated audio signals, the host device simulates different Speech-to-Distortion Ratios (SDRs) by scaling the interfering signal before mixing the interfering signal with the clean target utterance. After creating the speech mixtures, the host device performs data augmentation operations on the training audio signals to create simulated audio signals containing background (sometimes called "additive noise") or reverberation noise.

As an example of the speech separation engine operations, the input audio signal containing a speech mixture signal x(t) may be represented as: $x(t)=s_{tar}(t)+\alpha s_{interf}(t)+n(t)$, where $s_{tar}(t)$ is the target speaker's signal; $s_{interf}(t)$ is an interfering speaker's signal; n(t) is the noise; and a is a scaling factor according to the SDR of the given training signal.

The spectro-temporal speaker mask function of the speech separation engine extracts a speaker mask for the particular audio signal. As an example, the speaker mask function is represented by:

$$M_{ss}[k, t] = \frac{S_{tar}[k, t]^2}{X[k, t]^2},$$

where $M_{ss}[k, t]$ is the spectro-temporal speaker mask; $S_{tar}[k, t]$ is the filterbank for features of the target speaker signal; and X[k, t] is the filterbank for features of the input audio signal containing the mixture of speaker signals.

The speech separation engine is trained to estimate the speaker separation speaker mask function. In operation, the speaker mask is multiplied with the input mixture signal's filterbank of features representation to obtain the target speaker's speech. The speech separation engine then applies the speaker mask against the features of the initial audio signal containing the mixture of speech signals. The speech separation engine outputs a target speaker signal, or the features of the target speaker signal no longer including the interfering speaker signals. The machine-learning architecture feeds the features of the target speaker signal to the noise suppression engine to suppress the noise in the target speaker signal.

The noise suppression engine suppresses the background non-speech noises from a noisy file containing a single speaker's speech. The noise suppression system is trained to separate speech from non-speech background noises. The noise suppression engine is trained to suppress any number (e.g., hundred, thousands) of types of stationary and non-stationary noises (sometimes referred to as "additive noise"). The noise suppression engine is also trained to reduce the adverse degradation of speech due to room reverberation and acoustic echo (sometimes referred to "reverberation").

The noise suppression engine receives the target speaker signal containing the one or more types of noise (e.g., additive noise, reverberation) and if necessary extracts the features from the target speaker signal. The noise suppression engine extracts a noise mask for the target audio signal based upon the types and intensity of noises in the target audio signal. The noise suppression engine applies the noise mask on the features of the target speaker signal to output an enhanced speaker signal or features of the enhanced speaker signal, thereby suppressing the noise in the target speaker signal.

For training the noise suppression engine, the host device may generate the training dataset using a "clean" speech dataset, mixtures of speech signals, and data files containing various types of noise signals. The host device may randomly select noise files from a noise corpus and perform data augmentation operations to add the noise signals to the training signals containing the speech mixtures. The host device may select and apply the noise signals randomly to generate simulated audio signals with a range of Signal-to-Noise Ratios (SNRs).

As an example of the noise suppression engine operations, an input noisy speech spectrum of an audio signal may be represented as: X[n]=S[n]+D[n], where X[n] represents the input noisy speech spectrum at frame n; S[n] represents the corresponding "clean" speech spectrum; and D[n] represents the spectrum of background noise.

The noise mask extracted by the noise suppression engine is a ratio Y[n] between the clean spectrum (e.g., magnitude of a frequency spectrum of the clean signal) and noisy spectrum (e.g., magnitude of a frequency spectrum of the noisy signal containing a multi-speaker signal mixture and/or one or more types of noise), represented as $$Y[n] = \frac{|S[n]|^2}{|X[n]|^2}.$$

In this example operation, X[n], S[n], D[n], and Y[n] are vectors of dimensionality K, which represents the number of frequency channels.

Prior approaches to speech enhancement algorithms, such as Wiener filtering and MMSE estimators, rely on the accurate estimation of the a-priori or a-posteriori SNR. Most existing algorithms focus on estimating a noise spectrum $E\{|D[n]|^2\}$ or the a-priori SNR. Embodiments of the speech separation engine discussed herein define an intended noise mask Y[n] as the ratio of these SNRs or a ratio of the magnitude of a clean signal for the target speaker to the magnitude of a noisy signal. Thus, the noise mask ratio Y[n] may be represented as:

$$Y[n] = \frac{SNR_{priori}[n]}{SNR_{post}[n]}.$$

The neural network architecture of noise suppression engine is trained to estimate the mask function Y[n] from the input noisy signal (e.g., target audio signal). The noise suppression engine may employ a scale-dependent segment SNR of the reconstructed output signal that is used as the cost function for training the network. In some implementations, during training, only the layers of the noise suppression engine are updated. The layers of the noise suppression engine are tuned for separating speech away from non-speech background noises.

The machine-learning architecture employs the speaker-embedding engine for extracting speaker embeddings as feature vectors representing a particular speaker's utterances in speech signals. The details of the speaker-embedding engine need not be fully explored herein. Example embodiments of a speaker-embedding engine may be found in U.S. application Ser. No. 15/262,748, entitled "End-To-End Speaker Recognition Using Deep Neural Network;" U.S. application Ser. No. 15/910,387, entitled "Method and Apparatus for Detecting Spoofing Conditions;" U.S. application Ser. No. 17/155,851, entitled "Robust Spoofing Detection System Using Deep Residual Neural Networks;" U.S. application Ser. No. 17/192,464, entitled "Systems and Methods of Speaker-Independent Embedding for Identification and Verification from Audio;" and U.S. application Ser. No. 17/165,180, entitled "Cross-Channel Enrollment and Authentication of Voice Biometrics," each of which has been incorporated by reference in its entirety.

For purposes of this disclosure, the speaker-embedding engine extracts a feature vector for the target speaker, which the speech separation engine uses to extract the speaker mask. In some cases, the target speaker is an enrolled user of a host system, in which case the speaker-embedding engine extracts one or more enrollment feature vectors from one or more enrollment signals. The speaker-embedding engine algorithmically combines these enrollment feature vectors to extracts and stores an enrolled voiceprint for later use by the speech separation engine. In some cases, the target speaker is not enrolled with the host system or the machine-learning architecture does not have enough time to retrieve the enrolled voiceprint, in which case the speech separation engine initially applies a preconfigured default voiceprint on some predetermined amount (e.g., first 10-second segment) of the input audio signal. Meanwhile, the speaker-embedding engine continues extracting feature vectors from subsequent portions of the input audio signal to refine and update the default voiceprint, ultimately outputting the target voiceprint more closely tailored to the target speaker.

The machine-learning architecture can include a post-processing, waveform synthesis engine for transforming the features of the enhanced speaker signal from the spectral-temporal representation to a time-domain frequency representation. The waveform synthesis engine outputs the enhanced speaker signal in a machine-readable format representing the enhanced speaker signal as a waveform. Any number of downstream operations may employ the enhanced speaker signal with improved accuracy or efficiency as a benefit of the improved quality compared to the original input audio signal, which contained any number of interfering speaker signals and noise.

FIG. 1A shows components of a system 100*a* for receiving and analyzing telephone calls. The system 100*a* comprises a call analytics system 101, call center systems 110 of customer enterprises (e.g., companies, government entities, universities), and caller devices 114. The call analytics system 101 includes analytics servers 102, analytics databases 104, and admin devices 103. The call center system 110 includes call center servers 111, call center databases 112, and agent devices 116. Embodiments may comprise additional or alternative components or omit certain components from those of FIG. 1A, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1A shows the analytics server 102 as a distinct computing device from the analytics database 104. In some embodiments, the analytics database 104 may be integrated into the analytics server 102.

Figure 1B:
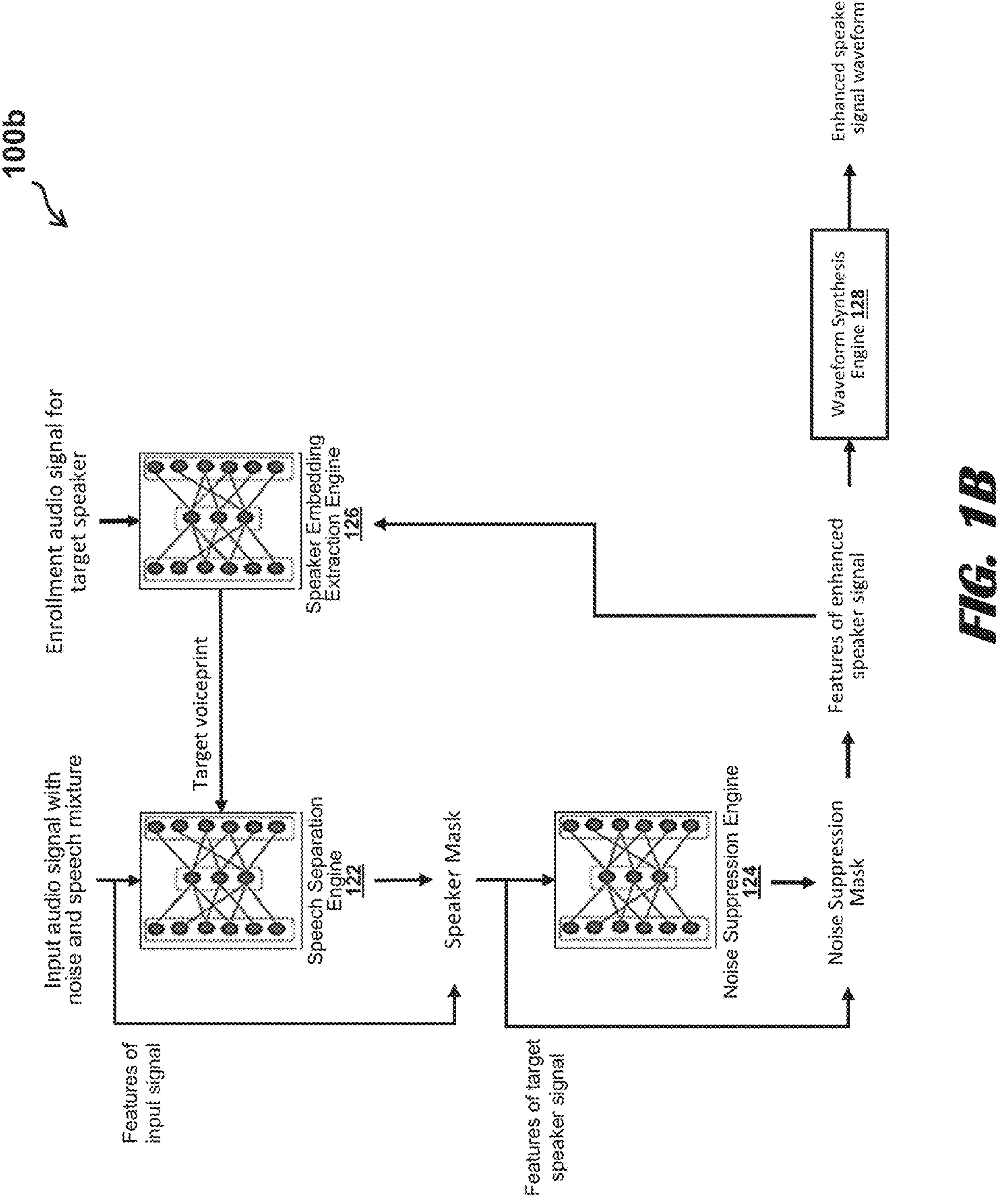
FIG. 1B shows components of a machine-learning architecture executed by an analytics server of the system shown in FIG. 1A, according to an embodiment.

FIG. 1B shows components of a machine-learning architecture 100*b* executed by the analytics server 102 of the system 100*a*, where the machine-learning architecture 100*b* includes operations or layers for generating an enhanced audio signal based upon an input audio signal that contains a mixture of speaker signals and/or various types of noise. The analytics server 102 executes various software programming for applying the components of the machine-learning architecture 100*b* on the input audio signal and performing the various operations for processing the input audio signal and generating the enhanced audio signal.

In some implementations, the enhanced audio signal may be the desired result of implementing the machine-learning architecture 100*b* to improve the caller and call center agent's experiences when the caller contacts the call center system 110. However, any number of downstream operations may reference the enhanced audio signal in order to benefit from the improved quality over typical input audio signals. These downstream operations may include, for example, improving speaker recognition or speaker verification operations, updating speaker recognition models, and improving speaker activity detection (SAD) programs, among others. For example, the analytics server 102 may use the enhanced audio signal, rather than the initial input audio signal, when determining whether the caller is an enrolled speaker registered with the call center system 110 or the analytics system 101 for voice-biometric authentication operations.

Various hardware and software components of one or more public or private networks may interconnect the various components of the system 100*a*. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the end-user devices 114 may communicate with callees (e.g., call center agents) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Various different entities manage or organize the components of the telecommunications systems, such as carriers, networks, and exchanges, among others.

The caller devices 114 (sometimes referred to as "end-user devices") may be any communications or computing device that the caller operates to access the services of the call center system 110 through the various communications channels. For instance, the end-user may place the call to the call center system 110 through a telephony network or through a software application executed by the caller device 114. Non-limiting examples of caller devices 114 may include landline phones 114*a*, mobile phones 114*b*, calling computing devices 114*c*, or edge devices 114*d*. The landline phones 114*a* and mobile phones 114*b* are telecommunications-oriented devices (e.g., telephones) that communicate via telecommunications channels. The caller devices 114, however, are not limited to the telecommunications-oriented devices or channels. For instance, in some cases, the mobile phones 114*b* may communicate via a computing network channel (e.g., the Internet). The caller device 114 may also include an electronic device comprising a processor and/or software, such as a calling computing device 114*c* or edge device 114*d* implementing, for example, voice-over-IP (VoIP) telecommunications, data streaming via a TCP/IP network, or other computing network channel. The edge device 114*d* may include any Internet of Things (IoT) device or other electronic device for computing network communications. The edge device 114*d* could be any smart device capable of executing software applications and/or performing voice interface operations. Non-limiting examples of the edge device 114*d* may include voice assistant devices, automobiles, smart appliances, and the like.

An analytics service operates the analytics system 102 to perform various call analytics operations on behalf of the enterprise's call center system 110. The analytics operations include, for example, generating the enhanced speaker signal, fraud detection, and caller authentication. An end user-facing enterprise organization (e.g., corporation, government entity, university) operates the call center system 110 to service calls or web-based interactions with the end users via the various communication channels. The call analytics system 101 and the call center system 110 represent network infrastructures 101, 110 comprising physically and logically related software and electronic devices managed or operated by various enterprise organizations. The devices of each network system infrastructure 101, 110 are configured to provide the intended services.

The system 100*a* comprises various hardware and software components that capture and store various types of call data, including audio data or metadata related to the call received at the call center system 110. The call data may include, for example, audio data (e.g., audio recording, audio segments, low-level spectro-temporal features, acoustic features), caller information, and metadata (e.g., protocol headers, device identifiers) related to particular software (e.g., Skype, codecs) and protocols (e.g., TCP/IP, SIP, SS7) used to execute the call via the particular communication channel (e.g., landline telecommunications, cellular telecommunications, Internet).

The call center system 110 is operated by a particular enterprise to offer various services to the enterprise's end-users (e.g., customers, account holders). The call center system 110 includes a call center server 111 or other computing device that executes various operations related managing the inbound calls. These operations include receiving or generating various forms of call data, and forwarding the call data to the analytics system 101.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more call center systems 110. Although FIG. 1A shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

The analytics server 102 executes data analysis and audio-processing software that includes machine-learning (or artificial intelligence) software routines. Non-limiting examples of such audio-processing operations may include ingesting input audio signals (e.g., pre-processing, data augmentation), automatic speaker verification (ASV), speaker recognition or verification, and generating enhanced audio signals for a certain targeted speaker, among any number of addition or alternative operations. Certain audio-processing software routines execute the machine-learning operations, which invoke and apply the machine-learning architecture 100*b* containing any number of machine-executed operations. The machine-learning architecture 100*b* may include any number of machine-learning architecture and models implementing various types of machine-learning techniques, such as a Gaussian Mixture Matrix (GMM), neural network (e.g., convolutional neural network, deep neural network), and the like. The machine-learning architecture 100*b* comprises functions or layers that define sub-architectures or operations, such as the speech separation engine 122, the noise suppression engine 124, and the speaker-embedding engine 126, among others (e.g., pre-processing operations, data augmentation operations, waveform synthesis engine 128). As mentioned, the analytics server 102 may execute any number of machine-learning architectures having any number of layers, though for ease of description the analytics server 102 in FIGS. 1A-1B executes a single machine-learning architecture 100*b* for generating a speaker-specific enhanced audio signal from an input audio signal containing a mixture of multiple speakers' speech signals and/or various types of noise.

The analytics server 102 and machine-learning architecture 100*b* operate logically in several operational phases, including a training phase, an optional enrollment phase, and a deployment phase (sometimes referred to as a "test phase" or "testing"), though some embodiments need not perform the enrollment phase for developing certain components of the machine-learning architecture 100*b*. The analytics server 102 receives input audio signals corresponding to the particular operational phase of the machine-learning architecture 100*b*, including training audio signals during the training phase, enrollment audio signals during the enrollment phase, and inbound audio signals during the deployment phase. The analytics server 102 may enable or disable certain layers of the machine-learning architecture 100*b* to apply or avoid applying these layers during the corresponding operational phase.

The functions and signals of the various operational phases are not always mutually exclusive in every embodiment. For example, during a deployment phase, the machine-learning architecture 100*b* may receive an inbound audio signal for a particular target speaker who is an enrolled user of the call center system 110, and then output the enhanced audio signal accordingly. The speaker-embedding engine 126 may update a stored enrolled voiceprint of the enrolled target speaker using the enhanced audio signal. In this example, the speaker-embedding engine 126 treats the enhanced audio signal as an enrollment audio signal, though the enhanced audio signal was generated during the deployment phase. Additional embodiments discussed herein provide further examples of such overlaps.

Certain layers of the machine-learning architecture 100*b* or sub-architectures may perform various pre-processing operations or data augmentation operations on the input audio signals for certain operational phases. In some implementations, the analytics server 102 performs the pre-processing or data augmentation operations on the input audio signal before executing and applying the machine-learning architecture on the input audio signal. Additionally or alternatively, the machine-learning architecture comprises layers instructing the analytics server 102 to perform the pre-processing or data augmentation operations. Non-limiting examples of the pre-processing operations on inputted audio signals include parsing or segmenting the input audio signal into frames or segments (e.g., speech segments of a given length, non-speech segments of a given length), performing one or more transformation functions (e.g., FFT, SFT), and extracting various types of features from the input audio signal, among other potential pre-processing operations. Non-limiting examples of such data augmentation operations include generating simulated audio signals containing a mixture of speaker signals (e.g., target speaker signal, interfering speaker signal), generating simulated audio signals containing a mixture of speaker signals and noise signals, and duration clipping, among others.

The analytics server 102 may execute the training phase in various different configurations for training the speech separation engine 122 and the noise suppression engine 124, including independent training, joint training, and progressive training. In joint training, analytics server 102 trains the speech separation engine 122 and the noise suppression engine 124 separately, on separate training datasets. Each respective model outputs distinct predicted outputs based on the distinct training datasets. The analytics server 102 generates distinct levels of error for each model based upon the differences between the expected output (indicated by a "clean" reference audio signal or other metadata of the training signals) and a predicted output. Likewise, the analytics server 102 tunes the parameters (e.g., hyper-parameters, weights) of each model based upon the model's level of error, without regard to the other model's level of error. In operations, the speech separation engine 122 and noise suppression engine 124 are cascaded to form the speaker-specific speech-enhancement machine-learning architecture 100*b*. The two models tuned for their respective tasks work together in a cascade to perform suppression of interfering speakers and background noises.

In joint training, the speech separation engine 122 and noise suppression engine 124 are cascaded together and trained jointly on a noisy speech mixture dataset. The training output for the speech separation engine 122 is the predicted speaker mask, while the training output for noise suppression engine 124 is the noise suppression ideal ratio mask (predicted noise mask) generated after applying the predicted speaker mask on the features of the training audio signal. The analytics server 102 evaluates a single level of error for both models and may tune the parameters of both models during the joint training. In some embodiments, the analytics server 102 determines the SDR between an expected clean reference audio signal and the predicted output (e.g., predicted features, predicted enhanced audio signal waveform) as an additional loss function in the joint model training.

In progressive training, the analytics server 102 takes a quasi-hybrid approach. The analytics server 102 trains the speech separation engine 122 first, followed by the noise suppression engine 124. The analytics server 102 fixes (e.g., stores) the parameters of the speech separation engine 122 when the level of error satisfies a training threshold level of error. The analytics server 102 then applies both the speech separation engine 122 and noise suppression engine 124 on training audio signals, but tunes only the parameters of the noise suppression engine 124 until the level of error satisfies a training threshold. The parameters of the noise suppression engine 124 can be fine-tuned using the output of the speech separation engine 122 so that the performance of noise suppression is improved in the cascaded arrangement. In some embodiments, independently pre-trained models can be cascaded together and optionally fine-tuned jointly on a noisy speech mixture dataset. These modes of progressive model training help improve the performance of the speaker specific speech enhancement machine-learning architecture 100*b*.

The machine-learning architecture 100*b* may operate in an offline mode or in a real-time mode. In the offline mode, the machine-learning architecture 100*b* ingests and operates on a complete audio file (e.g., input audio signal data stream) in a non-causal manner, where response time is not entirely critical to operation. For example, the machine-learning architecture 100*b* may be integrated into multimedia project software executed by end-user computer 114*c*, where the software of the end-user computer 114*c* corrects flaws or improves the quality of audio captured in an audio file (e.g., home recording) or audiovisual file (e.g., home movie). In an online mode, the operations of the machine-learning architecture 100*b* are critical to software operations. The online or real-time mode of operation is typically the preferred mode of use for applications such as telephony, Internet-based conference calls, and the like, to enhance the audio stream in real-time. For example, the end-user computer 114*c* may execute an audio or audiovisual messaging software application (e.g., Skype®, Teams®, Zoom®) that implements the machine-learning architecture 100*b* to improve the quality of the audio signal. Since the call is ongoing, the end-user computer 114*c* cannot capture and process the entire audio file for processing by the machine-learning architecture 100*b*.

In offline mode, the analytics server 102 applies the speaker-embedding engine 126 on the complete target speaker utterance to extract a target voiceprint as the clean reference. Optionally, the speech separation engine 122 and/or noise suppression engine 124 perform de-noising operations of the utterance before extracting the target reference voiceprint for the target speaker. Optionally, the target speaker also has an option of providing a relatively clean reference enrollment audio signal along with the noisy mixed speech utterance for processing.

In the real-time mode of operation, the machine-learning architecture 100*b* performs speaker specific enhancement of the audio stream in real-time or near real-time. In the online mode, the speaker-embedding engine 126 extracts the target voiceprint of the dominant speaker in real-time and updates the target voiceprint at regular time intervals. When the target speaker provides a clean reference utterance as an enrollment signal, the speaker-embedding engine 126 extracts an enrolled voiceprint, which the machine-learning architecture 100*b* uses as the reference target voiceprint. In the absence of the enrollment audio signal, the speech separation engine 122 and/or noise suppression engine 124 process some amount of audio (e.g., initial ten seconds, initial ten-second segment) of audio using a pre-stored default average voiceprint. The machine-learning architecture 100*b* assumes that in the initial seconds of the audio signal the target speaker is the dominant speaker with little to no interference from other speakers. Over time, the machine-learning architecture 100*b* updates and adjusts the target speaker voiceprint and gets better at performing speaker specific speech enhancement.

With reference to FIG. 1B, the analytics server 102 executes the machine-learning architecture 100*b* comprising a plurality of operations or layers defining the various sub-architectures, including the speech separation engine 122 (sometimes referred to as a "speech separation model"), the noise suppression engine 124 (sometimes referred to as a "noise suppression model"), and the speaker embedding engine 126 (sometimes referred to as a "speaker recognition model"), and the waveform synthesis engine 128. the machine-learning architecture 100*b* receives the input audio signal (e.g., training audio signal, enrollment audio signal, inbound audio signal) in the form of a raw waveform, data representing the raw waveform, or as data representing pre-processed segments or frames. The input audio signal contains the mixture of speaker signals and further contains various forms of noise-based degradation.

The speech separation engine 122 is a neural network architecture comprising layers that identify or separate the target speaker's speech signal from a mixture of speech signals in the input audio signal. The speech separation engine 122 receives as inputs the input audio signal containing the mixture of speech signals and a target speaker embedding (sometimes called the "target voiceprint"). The speech separation engine 122 applies a speaker mask function on the features of the input audio signal and/or the target voiceprint to extract a speaker mask. The speech separation engine 122 then applies the speaker mask on the features of the input audio signal to generate the features of a target speaker signal, where the speaker mask suppresses the interfering speaker signals in the mixture of speaker signals.

The speech separation engine 122 may receive or retrieve the target voiceprint from a non-transitory memory location, such as a memory of the analytics server 102, an analytics database 104, or call center database 112. For example, in an online mode, the speech separation engine 122 applies the default target voiceprint stored in the analytics database 104. The analytics server 102 may store the default target voiceprint in a buffer memory as the speaker-embedding engine 126 continues to reference, adjust, and update the default target voiceprint based on additional input audio data of the data stream. As another example, if the target speaker is an enrolled user of the call center system 110, then the speech separation engine 122 retrieves the enrolled voiceprint of target speaker and applies the enrolled voiceprint as the target voiceprint.

In some implementations, the speech separation engine 122 or other software programming of the analytics server 102 identify the particular target speaker based upon one or more characteristics of the input audio signal having the mixture of speech signals. These characteristics may include, for example, the duration of speaker speech, the speaker who initiated the call or contact, or a manual user input from an administrative user, among other potential call content or metadata suggesting or indicating the identity of the target speaker. The analytics server 102 may employ any of such characteristics or any combination thereof. As an example, the speech separation engine 122 assumes or determines that the target speaker is a dominant speaker having a comparatively greater duration from the speech signals involving the particular speaker. As another example, the speech separation engine 122 assumes or determines that the target speaker is the initiating caller, where the target speech signal originated from the caller device 114 that initiated the call or contact to the call center system 110. The analytics server 102 receives one or more identifiers for the inbound caller device 114 and queries the analytics database 104 or the call center database 112 using a particular device identifier. If the database 104, 112 contains the device identifier for an enrolled speaker, then the analytics server 102 may presume the target speaker is an enrolled user associated with the device identifier.

In some embodiments, the speech separation engine 122 may progressively adapt the identified target speaker, as the analytics server 102 receives or analyzes additional data or metadata containing characteristic information for determining the target speaker. The speech separation engine 122 further analyzes additional characteristic information, and updates or confirms the assumed target speaker. For instance, the speech separation engine 122 may continually determine the target speaker in real-time (e.g., as the analytics server 102 or call center server 111 receives the data stream of the input audio signal), or according to one or more preconfigured triggers, such as a preconfigured interval (e.g., every second) or in response to receiving a preconfigured amount of data (e.g., each megabyte of data, each 10-ms speech segment).

The noise suppression engine 124 includes a neural network architecture, or other type of machine-learning architecture, configured to suppress or otherwise mitigate non-speech background noise from a noisy audio signal, such as the target speaker audio signal containing the target speaker's speech as outputted by the speech separation engine 122. The noise suppression engine 124 receives as input the target audio signal containing only the target speaker's utterances and one or more types of noise (e.g., additive background noise, reverberation). The noise suppression engine 124 applies a noise mask function on the features of the target audio signal to extract a noise mask. The noise suppression engine 124 then applies the noise mask on the features of the target audio signal to generate the features of an enhanced audio signal, where the noise mask suppresses the noise in the target audio signal outputted by the speech separation engine 122.

The layers of the speaker-embedding engine 126 extract a target speaker embedding as a feature vector based upon the features extracted from the portions of input audio signal involving the particular target speaker. The speaker-embedding engine 126 receives such features and generates the target speaker's embedding vector for the particular speaker.

During the training phase, the speaker-embedding engine 126 generates a predicted output (e.g., predicted feature vector, predicted speaker). Loss layers or other layers of the machine-learning architecture adjust model parameters (e.g., hyper-parameters, weights) of the speaker-embedding engine 126 based upon a level of error, representing a distance between the predicted output and an expected output (e.g., expected feature vector, expected speaker identity) indicated by training data (e.g., metadata tags) associated with the training audio signals. Once the model for the speaker-embedding engine 126 is trained, the analytics server 102 stores the model parameters into the analytics database 104 or call center database 112, and disables certain layers of the speaker-embedding engine 126 (e.g., classifier layers), thereby fixing the speaker-embedding engine 126 for later operational phases. The analytics server 102 may perform the optional data augmentation operations on clean training signals to generate simulated audio signals containing various forms of degradation, and apply the speaker-embedding engine 126 on the degraded training audio signals to force the speaker-embedding engine 126 to force the speaker-embedding engine 126 to evaluate and adjust for the various forms of degradation.

During the optional enrollment phase, the speaker-embedding engine 126 generates an enrolled voiceprint for an enrolled user. The speaker-embedding engine 126 extracts enrollee feature vectors from the features of the enrollment signals. The analytics server 102 algorithmically combines the enrollee feature vectors to generate the enrolled voiceprint (sometimes referred to as a "target enrolled voiceprint"). In some cases, the analytics server 102 may perform the data augmentation operations on the enrollment audio signals to extract enrollee feature vectors that adjust the enrolled voiceprint for degradation when combined with the enrollee feature vectors extracted from clean enrollment signals.

During the deployment phase, the speaker-embedding engine 126 extracts an inbound feature vector for a target speaker (sometimes referred to as a "inbound voiceprint" or "target inbound voiceprint") using the features extracted from an inbound audio signal. The speaker-embedding engine 126 generates a similarity score (e.g., cosine score) between the inbound voiceprint and the enrolled voiceprint, where the similarity score represents the comparative similarities between the inbound speaker and the enrolled speaker.

This description need not detail all of the various aspects and operations of the speaker-embedding engine 126. Example embodiments of the speaker-embedding engine 126 may be found in U.S. application Ser. No. 15/262,748, entitled "End-To-End Speaker Recognition Using Deep Neural Network;" U.S. application Ser. No. 15/910,387, entitled "Method and Apparatus for Detecting Spoofing Conditions;" U.S. application Ser. No. 17/155,851, entitled "Robust Spoofing Detection System Using Deep Residual Neural Networks;" U.S. application Ser. No. 17/192,464, entitled "Systems and Methods of Speaker-Independent Embedding for Identification and Verification from Audio;" and U.S. application Ser. No. 17/165,180, entitled "Cross-Channel Enrollment and Authentication of Voice Biometrics," each of which has been incorporated by reference in its entirety.

The machine-learning architecture **100*b* further includes a waveform synthesis engine 128 that takes low-level spectro-temporal features as input and outputs a waveform. In operation, the waveform synthesis engine 128 performs one or more transformations on the features of the enhanced audio signal as outputted by the noise suppression engine 124. The waveform synthesis engine 128** may, in some cases, estimate or backfill missing portions of the original input audio signal.

The analytics database 104 and/or the call center database 112 may be hosted on any computing device (e.g., server, desktop computer) comprising hardware and software components capable of performing the various processes and tasks described herein, such as non-transitory machine-readable storage media and database management software (DBMS). The analytics database 104 and/or the call center database 112 contains any number of corpora of training call data (e.g., training audio signals, training metadata) that are accessible to the analytics server 102 via the one or more networks. In some embodiments, the analytics server 102 employs supervised training to train the machine-learning models of the machine-learning architecture, where the analytics database 104 and/or the call center database 112 contains labels associated with the training call data or enrollment call data. The labels indicate, for example, the expected data for the training call data or enrollment call data. The analytics server 102 may also query an external database (not shown) to access a third-party corpus of training call data. An administrator may configure the analytics server 102 to select the training call data having various types of speaker-independent characteristics or metadata. The analytics database 104 stores the configuration inputs received from the agent device 116 that configure operational parameters of the fraud importance engine, as well as trained models, caller enrollment and registration information, and other types of information managing the functions of the analytics server 102.

As mentioned, the speech separation engine 122 references the analytics database 104 or other storage location of the system **100*a* target to retrieve the target voiceprint for generating the speaker mask. Where the target speaker is an enrolled user of the system 100*a* or call center system 110, the analytics database 104 stores the target voiceprint as an enrolled voiceprint and any enrollment audio signals associated with the enrolled target speaker. The analytics database 104 may further store updates the enrolled voiceprint, where the analytics server 102** updates the enrolled voiceprint using the features of the enhanced speaker signal.

Where the target speaker is not an enrolled user, or where the machine-learning architecture **100*b* operates in a "real-time" configuration, the speech separation engine 122 retrieves the preconfigured default voiceprint as the target voice for generating the speaker mask. As the speaker-embedding engine 126 refines and updates the default target voiceprint, the analytics database 104 or analytics server 102** may store the refined default target voiceprint.

The call center server 111 of a call center system 110 executes software processes for managing a call queue and/or routing calls made to the call center system 110, which may include routing calls to the appropriate call center agent devices 116 based on the inbound caller's comments, instructions, IVR inputs, or other inputs submitted during the inbound call. The call center server 111 can capture, query, or generate various types of call data (e.g., audio data, audio recording, speaker-independent characteristics, metadata, speaker inputs) about the call, the caller, and/or the caller device 114 and forward the call data to the agent device 116, where an agent UI of the agent device 116 displays the call data to the call center agent.

The call center server 111 also transmits the call data to the analytics system 101 to perform the various analytics processes on the call data of the inbound call or any prior call. The call center server 111 may transmit the call data to the analytics server 102 based upon a preconfigured triggering conditions (e.g., receiving the inbound phone call), instructions, or queries received from another device of the system 100 (e.g., agent device 116, admin device 103, analytics server 102), or as part of a batch transmitted at a regular interval or predetermined time.

The admin device 103 of the analytics system 101 is a computing device allowing personnel of the analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the analytics system 101 or provider system 110 and to issue queries and instructions to such components. In the example system 100, the agent device 116 configures the operations of the fraud importance engine and provides fraud detection feedback, though in some implementations, the admin device 103 performs one or more of these functions.

In some embodiments, the admin device 103 may further enter various configuration inputs for training the sub-architectures of the machine-learning architecture **100*b*. The analytics server 102 stores these inputs as metadata tags or indicators associated with the training audio signals. For instance, the admin device 103 may select the subset of training audio signals for the target speaker and indicate the expected identity of the target speaker and other expected information about the training audio signals. The admin device 103 may configure and input the default target voiceprint if the machine-learning architecture 100*b*** will operate in a real-time mode.

The agent device 116 of the call center system 110 may allow agents or other users of the call center system 110 to configure operations of devices of the call center system 110. For calls made to the call center system 110, the agent device 116 receives and displays via the agent UI some or all of the information associated with inbound call data, routed from the call center server 111 or from the analytics server 102. The agent UI further permits the agent to provide fraud detection feedback to the analytics server 102 and configure the operations of the machine-learning architecture **100*b* as with the admin device 103**.

Figure 2:
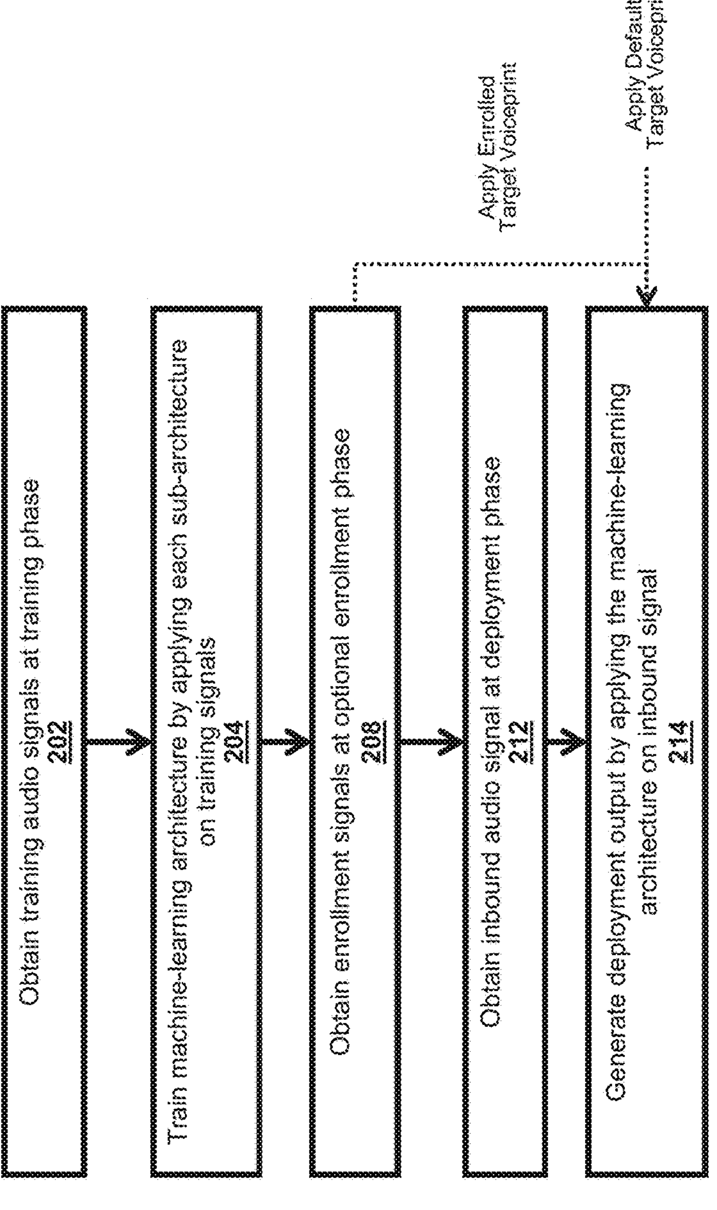
FIG. 2 shows execution steps of a method for audio-processing using a machine-learning architecture at each operational phase of the machine-learning architecture, according to an embodiment.

FIG. 2 shows execution steps of a method 200 for audio-processing using a machine-learning architecture at each operational phase of the machine-learning architecture. Embodiments may include additional, fewer, or different operations than those described in the method 200. The method 200 is performed by a server executing machine-readable software code associated with the machine-learning architecture, though any number of computing devices and processors may perform the various operations described here.

The machine-learning architecture includes any number of layers for performing the various operations described here, though the server may perform certain operations separately from the machine-learning architecture. The layers of the machine-learning architecture define sub-architectures, including a speech-separation engine, noise suppression engine, and speaker-embedding engine. Although described as "sub-architectures," these sub-architectures may be distinct machine-learning architectures or integrated into a single machine-learning architecture.

Certain steps of the method 200 include obtaining the input audio signals and/or pre-processing the input audio signals (e.g., training audio signal, enrollment audio signal, inbound audio signal) based upon the particular operational phase (e.g., training phase, enrollment phase, deployment phase). The server, or certain layers of the machine-learning architecture, may perform various pre-processing operations on the input audio signal. These pre-processing operations may include, for example, extracting low-level features (e.g., MFCCs) from the audio signals and transforming these features from a time-domain representation into a frequency-domain representation by performing FFT and/or SFT operations. The pre-processing operations may also include parsing the audio signals into frames or sub-frames, and performing various normalization or scaling operations. In some cases, the server performs pre-processing operations prior to feeding the audio data for input audio signal into the input layers of the machine-learning architecture. Additionally or alternatively, the server performs pre-processing operation as an in-network layer (e.g., input layer) of the machine-learning architecture.

The server, or certain layers of the machine-learning architecture, may perform one or more data augmentation operations on the input audio signal (e.g., training audio signal, enrollment audio signal). The data augmentation operations generate certain types of degradation for the input audio signal, thereby generating corresponding simulated audio signals from the input audio signal. During the training or optional enrollment phase, the layers of the machine-learning architecture ingest the resulting simulated signals to force the sub-architectures of the machine-learning architecture to evaluate and adjust for various types of degradation. Embodiments are not limited to data augmentation related to degradation, but may include other types of artifacts that might impact the quality of the input audio signals, such as the codecs used for communicating the input audio signal and certain types of audio events detected in the background, among others. The server may perform the various data augmentation operations as operations distinct from the machine-learning architecture or as in-network data augmentation layers. Moreover, the server may perform the various data augmentation operations in one or more of the operational phases, though the particular data augmentation operations performed may vary across each of the operational phases.

In step 202, the server places the machine-learning architecture into a training operational phase and obtains any number (sometimes thousands or hundreds of thousands) of training audio signals, which could include any combination of clean signals, noisy signals, simulated noisy signals, and signals having a mixture of speaker signals. The server obtains the training audio signals in one or more ways, such as receiving the training audio signals from one or more corpora of training audio signals, or by executing data augmentation operations to algorithmically generate simulated noisy or mixture signals.

The training signals are associated with metadata indicating, for example, the target speaker, a target voiceprint as a clean reference, or expected outputs for evaluating the level of error given the particular training signal. For instance, a subset of the training audio signals for a given target speaker contain speech signals (sometimes called "utterances") for the particular target speaker and are associated with metadata tags indicating the expected target speaker. In some implementations, the server may use one of these training audio signals as a reference ("clean audio signal") for extracting the reference target voiceprint for training and for performing data augmentation operations to generate simulated signals for training purposes.

The server may apply the data augmentation operations on the other training audio signals of the subset of signals for the particular target speaker. For example, the data augmentation operations include mixing a target speaker utterance with a randomly selected utterance of a randomly selected interfering speaker from the dataset of training audio signals. After mixing the target speaker's clean utterance with the interfering speaker's utterance, the server may further trim the mixture to the length of the clean target utterance, thereby generating a simulated audio signal with the mixture of speech signals having the same length as the clean reference audio signal for the target speaker.

In some cases, when performing the data augmentation operations (e.g., mixing the speech signals), the server may simulate different Speech-to-Distortion Ratios (SDR) by scaling the interfering signal before mixing the interfering speaker's utterance with the clean target utterance. The server may simulate one or more speech mixtures with SDRs ranging from, for example, −5 to 15 dB, though this range is not limiting on other potential embodiments.

The data augmentation operations are not limited to generating speech mixtures. Before or after generating the simulated signals containing the speech mixtures, the server additionally or alternatively performs the data augmentation operations for non-speech background noises. For instance, the server may add background noises randomly selected from a large noise corpus to the simulated audio signal comprising the speech mixture. The server may apply these background noises to the simulated audio signal at SNRs ranging from, for example, 5 dB to 30 dB, though such range is not limiting on possible embodiments; moreover, the SNR ranges or other aspects of data augmentation may be different for training each sub-architecture. For instance, the speech separation engine may be trained using training audio signals having background noise SNR at 5 dB to 30 dB, whereas the noise suppression engine may be trained using training audio signals having background noise SNR at −5 dB to 25 dB.

The server or the input layers of the machine-learning architecture then feeds the training audio signals containing the speech mixtures and the noise into the sub-architectures (e.g., speech separation engine, noise suppression engine, speaker-embedding engine) of the machine-learning architecture.

In step 204, the server trains the machine-learning architecture by applying the sub-architectures (e.g., speaker separation engine, noise suppression engine, speaker-embedding engine) on the training signals. The server trains the speech separation engine and noise suppression engine to extract spectro-temporal masks (e.g., speaker mask, noise mask) and generate features of an output signal (e.g., noisy target speaker signal, enhanced speaker signal).

With respect to training the speech separation engine, the server applies the speech separation engine on the training audio signals that are each associated with tags or other metadata indicating the target speaker for the given training audio signal. The speech separation engine is trained to execute a speaker separation mask function that generates a predicted speaker mask based upon the features of the input audio signal (e.g., training signal) and a target voiceprint. To extract the predicted speaker mask for a given training signal, the speech separation engine applies the speaker mask function on the features extracted from the training audio signal and a preconfigured default voiceprint or an enrolled target voiceprint. The speech separation engine then applies the predicted speaker mask on the features of the training audio signal to suppress or otherwise mitigate interfering speaker signals in the mixture of speaker signals in the training audio signal. In operation, the speech separation engine multiplies (or otherwise algorithmically combines) the predicted target mask with the features extracted from the input audio signal having the mixture, thereby generating the features of a predicted target speaker audio signal.

During training, the server determines the accuracy or level of error of the speech separation engine using the target voiceprint or other reference signal as an expected output. Loss layers or other operations of the speech separation engine evaluate the level of error between the predicted output (e.g., predicted features of the target speaker signal, predicted target speaker signal waveform) and the expected output. If the server determines the level of error fails to satisfy a training threshold, then the server continues to adjust or tune the parameters of the speech separation engine until the predicted outputs generated by the speech separation engine have a satisfactory level of error.

The server may determine the target speaker for the given training audio signal according to an administrative-user configuration input expressly indicating the target speaker or reference signal, or based upon one or more characteristics of the training audio signal that indicate the target speaker or the reference signal. The administrative-user may input, via a UI of a client device, one or more configuring the machine-learning architecture training operations. These configuration inputs expressly indicate the expected target speaker to the speech separation engine. The server may determine the expected target speaker based upon a metadata tag associated with the training audio signal, indicating the expected target speaker to the speech separation engine.

The noise suppression engine separates the target speaker's speech from non-speech background noises, where the server trains the noise suppression engine to suppress any number (often, hundreds or thousands) of types of stationary and non-stationary noises (sometimes referred to as "additive noise") by applying the noise suppression engine on training audio signals containing the particular type of noise. The server may also train the noise suppression engine to reduce the adverse degradation affecting the quality of the target speaker signal, due to room reverberation and acoustic echo (sometimes collectively referred to as "reverberation") by applying the noise suppression engine on training audio signals containing the particular type of noise. The noise suppression engine applies a noise mask function on the features of the target audio signal to extract a predicted noise mask for the noisy target audio signal. The noise suppression engine applies the noise mask on the features of the target audio signal to generate the features of an enhanced audio signal.

During training, the server determines the accuracy or level of error of the noise suppression engine using the metadata tags or other data expressly indicating an expected output for a given input signal or otherwise indicating the levels or types of noise expected for the given training audio signal. Loss layers or other operations of the noise suppression engine evaluate the level of error between the predicted output (e.g., predicted features of the enhanced speaker signal, predicted enhanced speaker signal waveform) and the expected output. If the server determines the level of error fails to satisfy a training threshold, then the server continues to adjust or tune the parameters of the noise suppression engine until the predicted outputs generated by the noise suppression engine have a satisfactory level of error.

When the server determines the speech separation engine and noise suppression engine satisfy the threshold level of error, the server fixes the parameters of the corresponding models and stores the models into a database or other storage location.

In an optional enrollment phase, in step 208, the server obtains one or more enrollment signals for an enrollee-user during an optional enrollment phase. The server may obtain the enrollment signals passively or through an active enrollment process that prompts the enrolled user to provide certain utterances. The speaker-embedding engine extracts the feature vectors for the enrollment signals based upon the features extracted from the enrollment signals and then algorithmically combines the feature vectors to generate the enrollment voiceprint, which the server may later reference as the target voiceprint in certain circumstances or reference when training or retraining the machine-learning architecture.

In a deployment phase, in step 212, the server obtains the inbound audio signal containing a mixture of speakers and various forms of noise. The server may receive the inbound audio signal directly from the inbound caller device or via a third-party system (e.g., call center server, messaging app host server). The server may receive the inbound audio signal as part of a real-time communication between devices, or from a pre-stored memory location for offline processing.

In step 214, the server generates a deployment output by applying the machine-learning architecture on the inbound audio signal and the appropriate target voiceprint. The deployment output may include any number of potential outputs, such as the enhanced audio signal waveform generated by applying the speech separation engine and noise suppression engine on the input audio signal, the features of the enhance audio signal, or some other downstream determination or output, such as a risk score representing a similarity between the target speaker's features in the enhanced audio signal and an enrolled voiceprint for the target speaker.

When applying the speech separation engine on the inbound audio signal, the server retrieves and references the target voiceprint as the enrolled voiceprint of the target speaker, an inbound voiceprint extracted for this particular inbound call, and/or a pre-configured default voiceprint stored in non-transitory memory. The server applies the speech separation engine on the relevant target voiceprint and the features of the inbound audio signal to generate the speaker mask. The speech separation engine then applies a speaker mask on the features of the inbound audio signal to generate the target speaker signal, which suppresses the interfering speaker signals but not necessarily the background noise. The server applies the noise suppression engine on the features of the target audio signal to generate the noise mask. The noise suppression engine then applies a noise mask on the features of the target speaker's audio signal to generate the enhanced audio signal, which suppresses the various types of noise in the target speaker signal.

The server may send the features of the enhanced audio signal to a speaker recognition model (e.g., speaker-embedding engine) to perform certain operations, such as speaker verification or authentication, speaker diarization, and the like. The speaker recognition model may also update an enrolled voiceprint for the target speaker based upon the features of the enhanced audio signal. Additionally or alternatively, the server may apply a waveform synthesis engine configured to generate the waveform representation of the enhanced audio signal. The server may transmit enhanced audio signal waveform to any number of downstream destinations or devices, such as another participant in an ongoing call or conference.

Speaker-Specific Speech Enhancement as Front-End for Speaker Recognition

Figure 3:
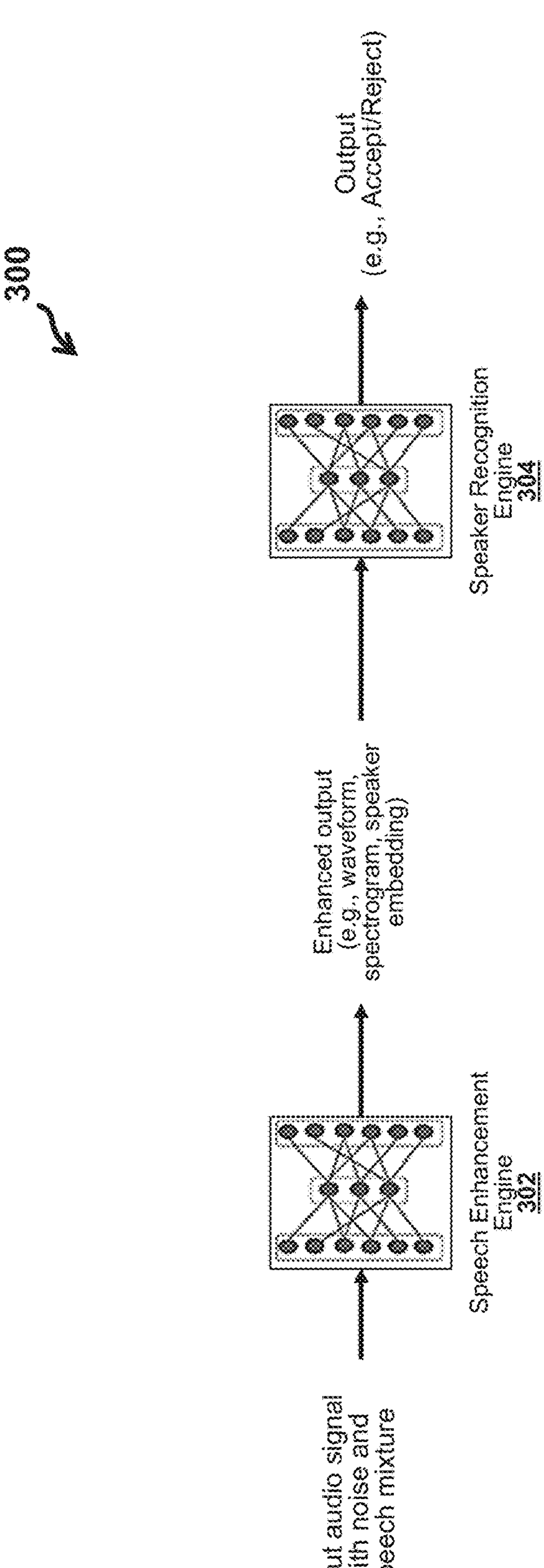
FIG. 3 is a diagram showing data flow of a machine-learning architecture performs that the operations of a speaker-specific speech enhancement system, according to an embodiment.

FIG. 3 is a diagram showing data flow of a machine-learning architecture 300 performs the operations of a speaker-specific speech enhancement system. The machine-learning architecture 300 may be executed by any computing device (e.g., server computer, personal computer, IoT device, smartphone) and comprises a speaker-specific speech enhancement engine 302, including a speech separation engine and noise suppression engine, and a speaker recognition engine 304, including a speaker-embedding engine. In the embodiment of FIG. 3, a software application of the computing device employs the speech enhancement engine 302 as a pre-processing operation for the speaker recognition system 304, such that the 302 generates the enhanced audio signal having relatively higher quality compared to an input audio signal captured or received by the computing device. The speaker recognition engine 304 determines a similarity score or risk score representing a likelihood that the target speaker is an enrolled speaker or risky speaker, based upon similarities between an inbound speaker voiceprint extracted from the enhanced audio signal and an enrolled voiceprint or a known risky voiceprint.

In some implementations, the enhanced speech waveform generated by the speech enhancement engine 302 is fed as the input to the speaker recognition engine 304. And in some embodiments, the speaker recognition engine 304 takes as input, for example, an intermediate representation of the enhanced audio signal (e.g., short-time fourier transform (STFT)) or the inbound speaker voiceprint used in the enhancement system, which may reduce the complexity of the operations performed by the speaker recognition engine 304. In some instances, the enrollment voiceprint is not provided or available, but may be extracted in real-time. The hybrid system may beneficially result in a higher speaker recognition accuracy.

Figure 4:
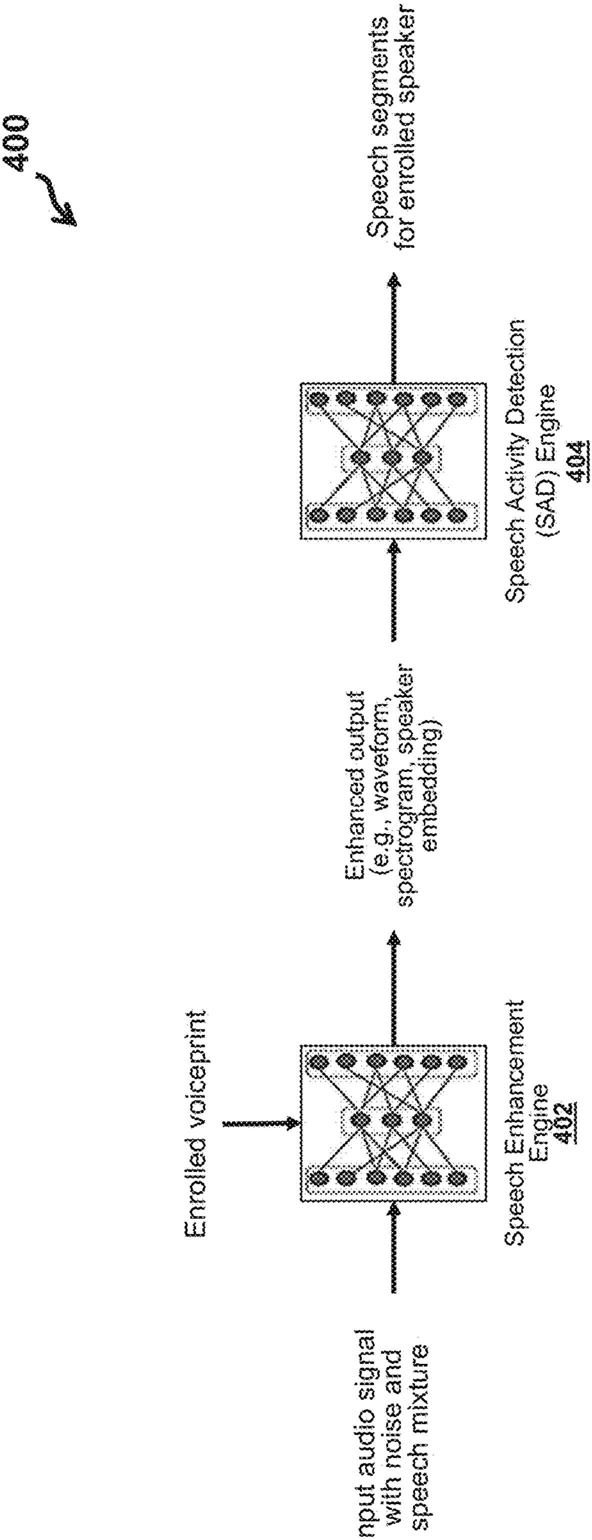
FIG. 4 shows is a diagram showing data flow of a machine-learning architecture that performs the operations of a speaker-specific speech enhancement system, according to an embodiment.

Speaker-Specific Speech Enhancement as Front-End for Speech Activity Detection FIG. 4 shows is a diagram showing data flow of a machine-learning architecture 400 performs the operations of a speaker-specific speech enhancement system. The machine-learning architecture 400 may be executed by any computing device (e.g., server computer, personal computer, IoT device, smartphone) and comprises a speaker-specific speech enhancement engine 402, including a speech separation engine and noise suppression engine, and a SAD engine 404 that identifies speech and non-speech portions of audio signals. Example embodiments of a SAD engine 404 may be found in U.S. Pat. No. 10,141,009, entitled "System and Method for Cluster-Based Audio Event Detection," filed May 31, 2017; and U.S. application Ser. No. 16/775,146, entitled "Unsupervised Keyword Spotting and Word Discovery for Fraud Analytics," filed Jan. 28, 2020, each of which is incorporated by reference in its entirety. In the embodiment of FIG. 4, a software application of the computing device employs the speech enhancement engine 402 as a pre-processing operation for the SAD engine 404, such that the 402 generates the enhanced audio signal having relatively higher quality compared to an input audio signal captured or received by the computing device.

Such embodiments may be particularly beneficial for energy-based speech activity detectors because most of the energy remaining after enhancement belongs to the speech portions. While it is possible to use the enhanced speech waveform as input to the SAD engine 404, it is also possible for the SAD engine 404 to use an intermediate representation like short-time fourier transform (STFT) to reduce the complexity of the SAD operations. Additionally, by applying the speech enhancement engine 402 on the input audio signal and an enrolled voiceprint, machine-learning architecture 400 beneficially functions as a speaker-specific SAD engine 404.

Figure 5:
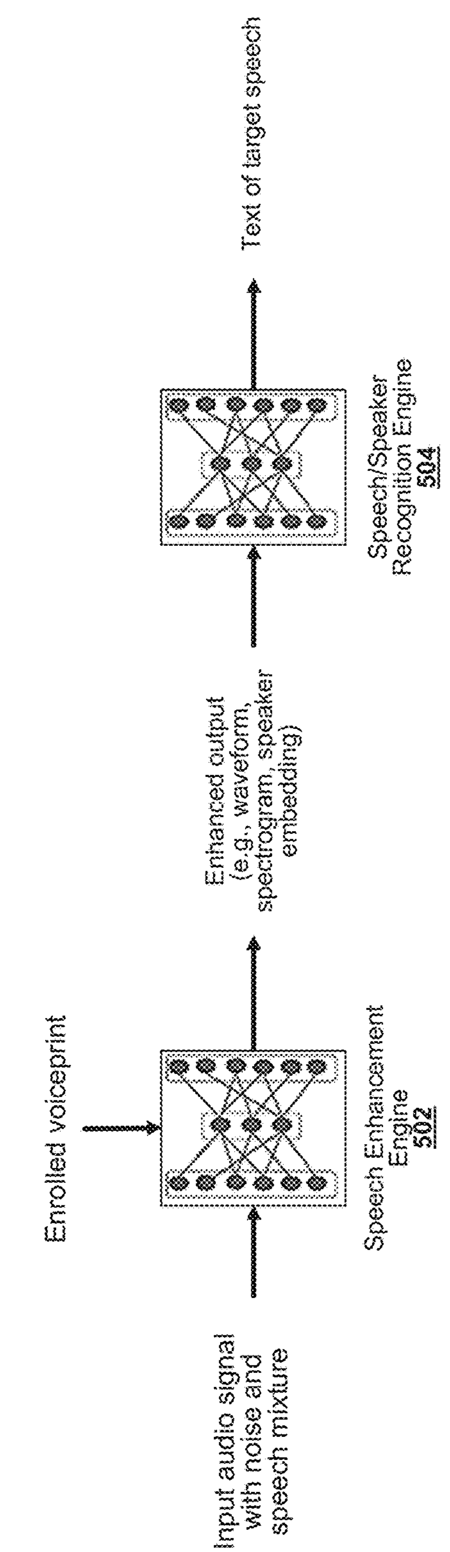
FIG. 5 shows is a diagram showing data flow of a machine-learning architecture that performs the operations of a speaker-specific speech enhancement system, according to an embodiment.

Speaker-Specific Speech Enhancement as Front-End for Automatic Speech Recognition FIG. 5 shows is a diagram showing data flow of a machine-learning architecture 500 performs the operations of a speaker-specific speech enhancement system. The machine-learning architecture 500 may be executed by any computing device (e.g., server computer, personal computer, IoT device, smartphone) and comprises a speaker-specific speech enhancement engine 502, including a speech separation engine and noise suppression engine, and an automatic speech recognition (ASR) engine 504. In the embodiment of FIG. 5, a software application of the computing device employs the speech enhancement engine 502 as a pre-processing operation for the ASR engine 504, such that the speech enhancement engine 502 generates the enhanced audio signal having relatively higher quality compared to an input audio signal captured or received by the computing device. The ASR engine 504 determines whether speech occurs and generates a speech-to-text transcription in the output text file.

The speech enhancement engine 504 may be employed to configure the ASR engine 504 to transcribe only the target speaker's speech. The speech enhancement engine 504, due to the speech separation engine, filters out the non-target speech, thereby reducing the complexity for the ASR engine 504 to filter interfering speakers.

Speaker-Specific Speech Enhancement for Improved Listening Experience

A speech enhancement engine may be introduced at various points of any voice channel. In this case, the speech enhancement engine aims to improve the quality of the speech and reduce interfering speech signals that are not from the known speaker. Non-limiting examples of implementations and installations of the speech enhancement engine include: at the microphone end of a smart device (e.g., phone, laptop, pad, smart home devices), to enhance the captured speech signal from the microphone at a destination side or intermediary device, at the speaker end of a smart device (e.g. phone, laptop, pad, smart home devices) to enhance the speech signal to be played to the speaker, or at a server to enhance all speech signals in a multi-party communication service (e.g., Zoom®, BlueJeans®, Skype®).

Speaker-Specific Speech Enhancement for Improved Voice Privacy

In some embodiments, an IoT device or other computing device employs a speech enhancement engine and speaker recognition engine for privacy purposes, where the IoT device would otherwise "listen" and capture audio streams of speakers in passive, ongoing manner. For example, in a household that uses a voice assistant (e.g., Amazon Alexa®), the parents might have concerns about the assistant collecting speech of the children or guests. In this example, the speaker-specific speech enhancement could be used to filter any speech (including overlapping speech) that does not belong to the registered users. The speech enhancement engine may function as a pre-processing operation of a speaker diarization operation, SAD engine, ASR engine, or other machine-learning architecture that captures and forwards speaker features. Because the speech separation engine may reference certain enrolled voiceprints to output an enhanced audio signal containing only the speech for the parents as the target speakers, the downstream speaker analytics operations do not receive the speech signals of the private or censored speakers (e.g., child, guest).

Speaker-Specific Speech Enhancement as Front-End for Speaker Diarization

In some embodiments, a machine-learning architecture performs the operations of a speaker-specific speech enhancement as a pre-processing operation of a speaker diarization engine. The machine-learning architecture may be executed by any computing device (e.g., server computer, personal computer, IoT device, smartphone) and comprises a speech enhancement engine, including a speech separation engine and noise suppression engine, and a speaker diarization engine. A software application of the computing device employs the speech enhancement engine as a pre-processing operation for the speaker diarization operation, such that the speech enhancement engine generates the enhanced audio signal having relatively higher quality compared to an input audio signal captured or received by the computing device. The speaker diarization engine determines whether speech occurs, and classifies which speaker is associated with certain speech signals.

While it is possible to use the enhanced speech waveform as input to the speaker diarization engine, it is also possible to use an intermediate representation like short-time fourier transform (STFT) to reduce the complexity of the operations performed by the speaker diarization engine. Additionally, in some implementations the speaker-specific speech enhancement engine could be integrated into the speaker diarization engine. Each instance the diarization system detects a change in the speaker, the speech enhancement engine changes the speaker embedding applied by the speech separation engine or a speaker-embedding engine.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:

receiving, by a computer, an inbound audio signal including a signal mixture of a plurality of inbound speakers;

extracting, by the computer, a first set of one or more features from the inbound audio signal;

extracting, by the computer, a speaker mask for the inbound audio signal by applying a first machine-learning architecture on a target enrolled voiceprint and the first set of one or more features, wherein the target enrolled voiceprint comprises an enrollment feature vector;

generating, by the computer, a second set of one or more features of a target audio signal for a target speaker of the plurality of inbound speakers by applying the speaker mask on the first set of one or more features;

extracting, by the computer, a noise mask for the target audio signal having one or more types of noise by applying a second machine-learning architecture on the second set of one or more features;

generating, by the computer, an enhanced audio signal by applying the noise mask on the second set of one or more features of the target audio signal, the enhanced audio signal includes the target audio signal having suppressed noise of the one or more types of noise in the target audio signal according to the noise mask; and generating, by the computer, an updated target enrolled voiceprint as an updated version of the target enrolled voiceprint corresponding to the target speaker based upon a feature vector extracted from the enhanced audio signal.

2. The method according to claim 1, wherein the computer generates a third set of one or more features of the enhanced audio signal by applying the noise mask, and wherein generating the enhanced audio signal includes:

applying, by the computer, a waveform synthesis engine on the third set of one or more features of the enhanced audio signal.

3. The method according to claim 1, wherein extracting the speaker mask for inbound audio signal includes:

determining, by the computer, a target speaker of the plurality of inbound speakers based upon one or more characteristics of the inbound audio signal; and retrieving, by the computer, the enrolled voiceprint corresponding to the target speaker as the target enrolled voiceprint, the enrolled voiceprint stored in a non-transitory memory.

4. The method according to claim 3, wherein the computer generates a third set of one or more features of the enhanced audio signal by applying the noise mask, the method further comprising:

extracting, by the computer, the feature vector for the enhanced audio signal by applying a third machine-learning architecture on the third set of one or more features; and updating, by the computer, the target enrolled voiceprint based upon the feature vector extracted from the third set of one or more features, thereby generating the updated target enrolled voiceprint.

5. The method according to claim 4, further comprising updating, by the computer, the target enrolled voiceprint by applying the third machine-learning architecture on one or more subsequent portions of the inbound audio signal.

6. The method according to claim 1, wherein the target enrolled voiceprint is a default voiceprint stored in a non-transitory memory.

7. The method according to claim 1, wherein the computer extracts the noise mask based upon a ratio of a magnitude of a first frequency spectrum of a clean audio signal to the magnitude of a second frequency spectrum of a noisy audio signal, the noisy audio signal containing at least one of a multi-speaker signal mixture and a type of noise.

8. The method according to claim 1, further comprising transmitting, by the computer executing a voice messaging software application, the enhanced audio signal to a second computing device executing the voice messaging software application.

9. The method according to claim 1, further comprising:

generating, by the computer, a similarity score based upon the enhanced audio signal and an enrolled voiceprint stored in a non-transitory memory; and identifying, by the computer, the target speaker as an enrolled speaker in response to determining that the similarity score satisfies a speaker recognition threshold.

10. The method according to claim 9, further comprising:

extracting, by the computer, one or more enrollment speaker embeddings from one or more enrollment audio signals for the enrolled speaker; and extracting, by the computer, the enrolled voiceprint for the enrolled speaker based upon the one or more enrollment speaker embeddings.

11. A system comprising:

a non-transitory machine readable storage configured to store machine-executable instructions for one or more machine-learning architectures; and a computer comprising a processor and configured to:

receive an inbound audio signal including a signal mixture of a plurality of inbound speakers;

extract a first set of one or more features from the inbound audio signal;

extract a speaker mask for the inbound audio signal by applying a first machine-learning architecture on a target enrolled voiceprint and the first set of one or more features, wherein the target enrolled voiceprint comprises an enrollment feature vector;

generate a second set of one or more features of a target audio signal for a target speaker of the plurality of inbound speakers by applying the speaker mask on the first set of one or more features;

extract a noise mask for the target audio signal having one or more types of noise by applying a second machine-learning architecture on the second set of one or more features;

generate an enhanced audio signal by applying the noise mask on the second set of one or more features of the target audio signal, the enhanced audio signal includes the target audio signal having suppressed noise of the one or more types of noise in the target audio signal according to the noise mask; and generate an updated target enrolled voiceprint as an updated version of the target enrolled voiceprint corresponding to the target speaker based upon a feature vector extracted from the enhanced audio signal.

12. The system according to claim 11, wherein the computer generates a third set of one or more features of the enhanced audio signal using the noise mask, and wherein when generating the enhanced audio signal the computer is configured to:

apply a waveform synthesis engine on the third set of one or more features of the enhanced audio signal.

13. The system according to claim 11, wherein when extracting the speaker mask for inbound audio signal the computer is configured to:

determining, by the computer, a target speaker of the plurality of inbound speakers based upon one or more characteristics of the inbound audio signal; and retrieving, by the computer, the enrolled voiceprint corresponding to the target speaker as the target enrolled voiceprint, the enrolled voiceprint stored in a non-transitory memory.

14. The system according to claim 13, wherein the computer generates a third set of one or more features of the enhanced audio signal by applying the noise mask, and wherein the computer is further configured to:

extract the feature vector for the enhanced audio signal by applying a third machine-learning architecture on the third set of one or more features; and update the target enrolled voiceprint based upon the feature vector extracted from the third set of one or more features, thereby generating the updated target enrolled voiceprint.

15. The system according to claim 14, wherein the computer is configured to update the target enrolled voiceprint by applying the third machine-learning architecture on one or more subsequent portions of the inbound audio signal.

16. The system according to claim 11, wherein the target enrolled voiceprint is a default voiceprint stored in a non-transitory memory.

17. The system according to claim 11, wherein the computer extracts the noise mask based upon a ratio of a magnitude of a first frequency spectrum of a clean target audio signal to the magnitude of a second frequency spectrum of a noisy audio signal, the noisy audio signal containing at least one of a multi-speaker signal mixture and a type of noise.

18. The system according to claim 11, wherein the computer is further configured to:

execute a voice messaging software application; and transmit the enhanced audio signal to a second computing device according to the voice messaging software application.

19. The system according to claim 11, wherein the computer is further configured to:

generate a similarity score based upon the enhanced audio signal and an enrolled voiceprint stored in a non-transitory memory; and identify the target speaker as an enrolled speaker in response to determining that the similarity score satisfies a speaker recognition threshold.

20. The system according to claim 19, wherein the computer is further configured to:

extract one or more enrollment speaker embeddings from one or more enrollment audio signals for the enrolled speaker; and extract the enrolled voiceprint for the enrolled speaker based upon the one or more enrollment speaker embeddings.

21. A computer-implemented method comprising:

receiving, by a computer, an inbound audio signal including a signal mixture of a plurality of inbound speakers;

applying, by the computer, a speaker suppression machine-learning architecture to the inbound audio signal and a target enrolled voiceprint to generate a target audio signal for a target speaker of the plurality of inbound speakers, wherein the target enrolled voiceprint comprises an enrollment feature vector;

applying, by the computer, a noise suppression machine-learning architecture to the target audio signal having one or more types of noise;

generating, by the computer, an enhanced audio signal based on an output of the noise suppression machine-learning architecture, the enhanced audio signal includes the target audio signal having suppressed noise of the one or more types of noise in the target audio signal according to the noise mask;

extracting, by the computer, a feature vector for the enhanced audio signal by applying a speaker embedding extraction machine-learning architecture on the enhanced audio signal; and updating, by the computer, the target enrolled voiceprint with an updated target enrolled voiceprint corresponding to the target speaker generated based upon the feature vector extracted from the enhanced audio signal.

* * * * *